US012141054B2

(12) United States Patent
Adachi et al.

(10) Patent No.: US 12,141,054 B2
(45) Date of Patent: Nov. 12, 2024

(54) TEST APPARATUS, TEST METHOD AND PROGRAM

(71) Applicant: NIPPON TELEGRAPH AND TELEPHONE CORPORATION, Tokyo (JP)

(72) Inventors: Yu Adachi, Tokyo (JP); Haruto Tanno, Tokyo (JP); Toshiyuki Kurabayashi, Tokyo (JP); Yu Yoshimura, Tokyo (JP); Hiroyuki Kirinuki, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 281 days.

(21) Appl. No.: 17/609,291

(22) PCT Filed: May 9, 2019

(86) PCT No.: PCT/JP2019/018593
§ 371 (c)(1),
(2) Date: Nov. 5, 2021

(87) PCT Pub. No.: WO2020/225912
PCT Pub. Date: Nov. 12, 2020

(65) Prior Publication Data
US 2022/0206935 A1    Jun. 30, 2022

(51) Int. Cl.
*G06F 11/36*    (2006.01)
(52) U.S. Cl.
CPC ...... *G06F 11/3692* (2013.01); *G06F 11/3684* (2013.01); *G06F 11/3688* (2013.01)

(58) Field of Classification Search
CPC ............. G06F 11/3684; G06F 11/2688; G06F 11/2692
USPC ........................................................ 717/124
See application file for complete search history.

(56) References Cited

U.S. PATENT DOCUMENTS

| | | | |
|---|---|---|---|
| 9,015,677 B2 * | 4/2015 | Tunik et al. | G06F 9/451 717/124 |
| 2013/0145351 A1 * | 6/2013 | Tunik et al. | G06F 9/451 717/135 |
| 2019/0065354 A1 * | 2/2019 | Jakov et al. | G06F 11/3688 |

FOREIGN PATENT DOCUMENTS

| | | |
|---|---|---|
| JP | 2012248097 A | 12/2012 |
| JP | 201444613 A | 3/2014 |

OTHER PUBLICATIONS

Kurabayashi et al. (2017) "Automatic Test Script Generation on GUI Testing" IPSJ/SIGSE Software Engineering Symposium (SES2017), Aug. 31, 2017, pp. 260-264.

* cited by examiner

*Primary Examiner* — Wei Y Zhen
*Assistant Examiner* — Mohammed N Huda (57) ABSTRACT

A test device includes a first determination unit that determines based on setting information set in advance whether each screen element of a first screen is a non-test target and an execution unit that automatically executes an operation with respect to the screen element determined not to be a non-test target by the first determination unit, whereby it is possible to exclude a part of elements related to a screen from test targets.

9 Claims, 8 Drawing Sheets

```
{                                    d1
  "URL:http://xxx/pw-resetting/" } [
 ],
         d2
  "screen ID:15" : [
    {"name":" name OF LINK A"},
    {"id":" id OF LINK B"},
    {"xpah":" xpath OF LINK C"},
    {"valve":" value OF LINK D"}
  ],
                          d3
  "SCREEN TITLE: BUSINESS INFORMATION REGISTRATION" : [
    {"name":" name OF BUTTON A"},
    {"name":" name OF BUTTON B"},
  ]
}
```

TEST APPARATUS, TEST METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/018593, filed on 9 May 2019, the disclosure of which is hereby incorporated herein by reference in its entirety.

TECHNICAL FIELD

The present invention relates to a test device, a test method, and a program.

BACKGROUND ART

In order to promptly provide services that meet diverse needs of consumers, in recent years, the development of software has been performed in short cycles, and there has been an increase in development lending itself to the frequent release of services. With services being provided in short cycles, there has also been an increase in the frequency of software testing to confirm that software is normally operated. In the software testing, function tests are performed to confirm whether a web application which is a test target operates as intended by a designer. Among the function tests, there is a problem in that it takes a huge amount of time for a test related to screen transition (hereinafter referred to as a "screen transition test"). The screen transition test is defined here as a "test for a function that makes it possible to confirm whether interaction from a client side is implemented according to a specification from a screen displayed on the client side."

A reason why the screen transition test takes time is that the interaction from the client side requires operation with human intervention such as click operation of links or buttons on a screen or inputting an appropriate value in an input form.

Because these operations are repeatedly performed on all screens, it takes a huge amount of time, and thus labor saving is required. As a method for reducing a time required for the screen transition test, a method for automatically executing the screen transition test by describing a test case in a script is widely known.

However, creating a test script also takes time, and it is generally considered that the effectiveness is not obtained in terms of task time unless automated testing using a created test script is performed three times or more. In addition, because a created test script cannot be used when a change is applied to an existing function, it is necessary to create a test script every time a specification is changed.

In order to solve such a problem, there is a reverse-based automated test script generation technique (hereinafter referred to as a "reverse-based test technique") that restores specification information by analyzing a web application to be tested and automatically generates a test script from the restored specification information (Non-Patent Literature 1).

In the reverse-based test technique, a test script is automatically generated by reversing the specification while dynamically analyzing a screen of the web application to be tested and generating a comprehensive test case. The reverse-based test technique makes it possible to realize the automation of a screen transition test without requiring to manually create the test script.

CITATION LIST

Non Patent Literature

Non Patent Literature 1: "Method of Automatically Generating Test Script in Test Accompanied by Screen Operation," co-authored by Toshiyuki Kurabayashi, Muneyoshi Iyama, Hiroyuki Kirinuki, and Haruto Tanno, Software Engineering Symposium 2017 Papers pp. 260-264, September 2017

SUMMARY OF THE INVENTION

Technical Problem

However, the reverse-based test technique targets a regression test for security update of OS and middleware, renewal of framework (FW) or the like that does not change the specification of the web application, and has a problem in that a test script becomes obsolete when there is a change in the specification of the web application due to the development such as function addition/revision or the like.

Figure 1:
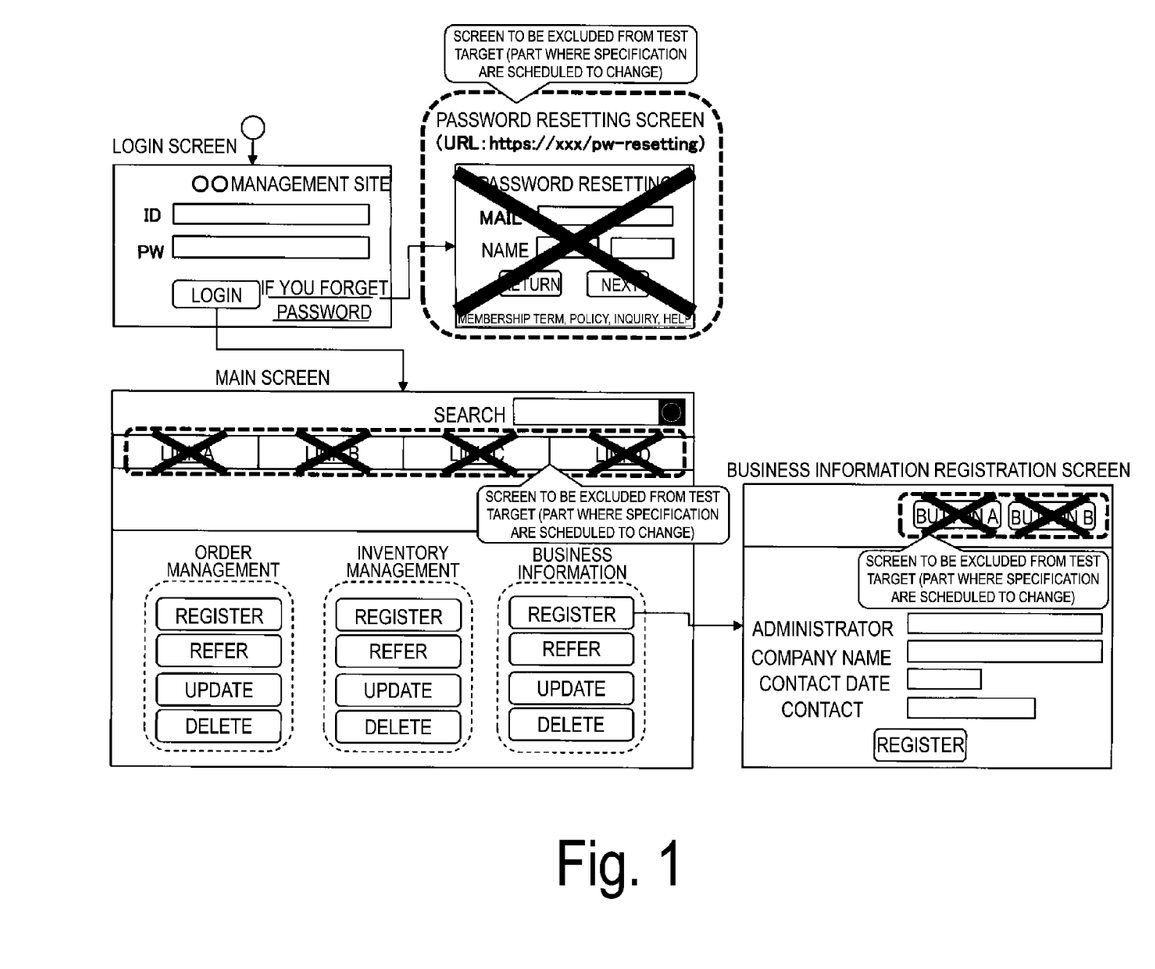
FIG. 1 is a diagram illustrating an example of screens and screen elements to be excluded from test targets.

For example, as illustrated in FIG. 1, when a part scheduled for specification change (such as a password resetting screen or a screen element scheduled for specification change in a main screen (links A to D)) is determined in advance, in the reverse-based test technique of the related art, it is difficult to exclude such portions from an analysis target (that is, a non-test target) and not to generate a test script.

The present invention is made in view of the above points, and an object thereof is to make it possible to exclude a part of elements related to a screen from a test target.

Means for Solving the Problem

Consequently, in order to solve the above problem, a test device includes a first determination unit that determines based on setting information set in advance whether each screen element of a first screen is a non-test target, and an execution unit that automatically executes an operation with respect to the screen element that is determined not to be a non-test target by the first determination unit.

Effects of the Invention

It is possible to exclude some elements related to a screen from test targets.

DESCRIPTION OF EMBODIMENTS

In the present embodiment, a technique of dynamic analysis in a reverse-based test technique is used as a base technique. The term "reverse-based test technique" refers to a reverse-based automated test script generation technique of restoring specification information by analyzing a web application which to be tested and automatically generating a test script from the restored specification information. In the present embodiment, screens and screen elements to be excluded from test targets are described in a list in advance, screens and screen elements corresponding to the list are searched each time screen transition at the time of dynamic analysis based on the base technique, and when the screens or the screen elements are found, operations on the screens or the screen elements are not performed.

Figure 2:
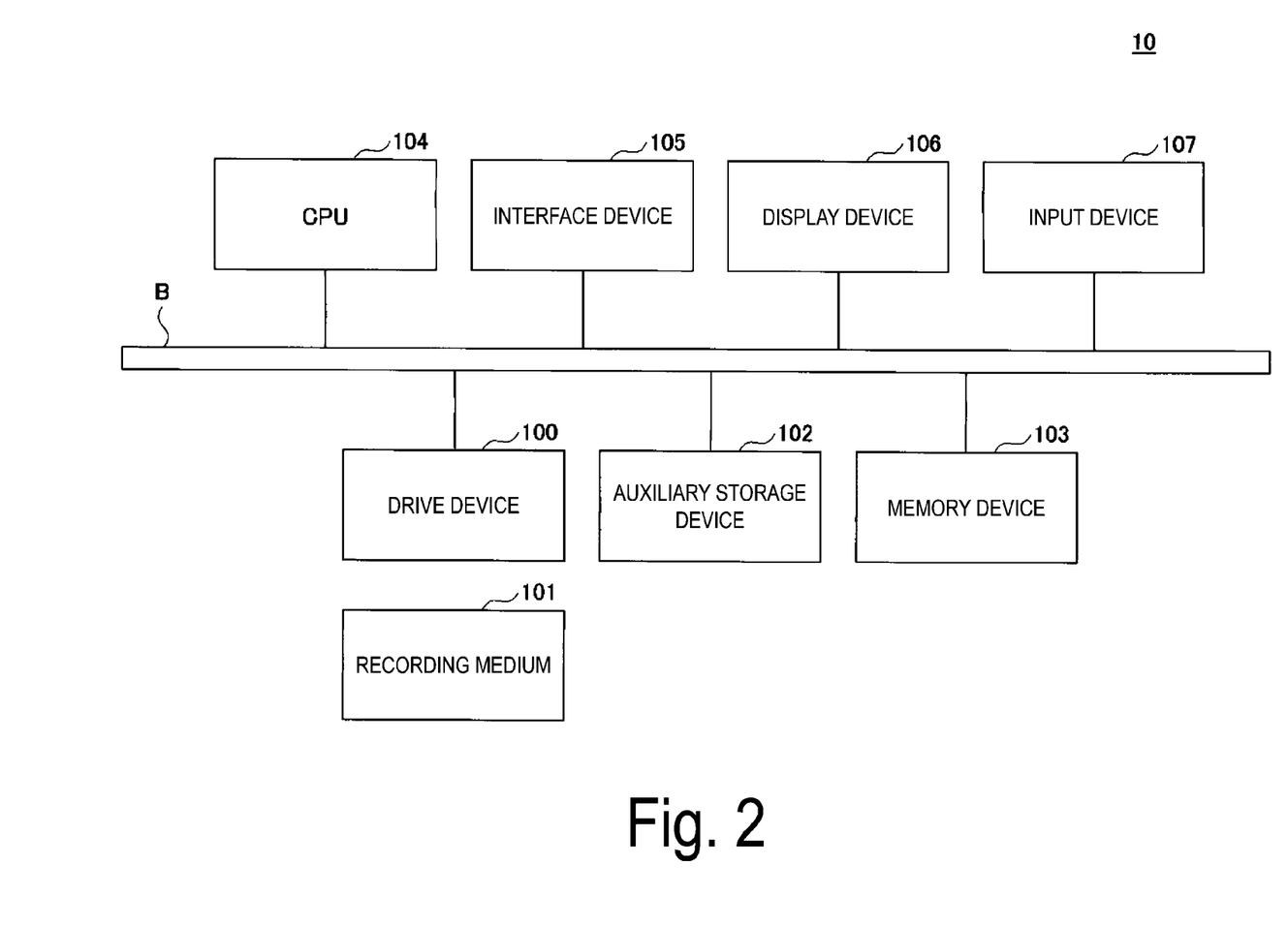
FIG. 2 is a diagram illustrating a hardware configuration example of a test device 10 in an embodiment of the present invention.

Hereinafter, an embodiment of the present invention will be described with reference to the accompanying drawings. FIG. 2 is a diagram illustrating a hardware configuration example of a test device 10 according to the embodiment of the present invention. The test device 10 of FIG. 2 includes a drive device 100, an auxiliary storage device 102, a memory device 103, a CPU 104, an interface device 105, a display device 106, an input device 107, and the like, which are connected to each other through a bus B.

A program for realizing processing in the test device 10 is provided by a recording medium 101 such as a CD-ROM. When the recording medium 101 having a program stored therein is set in the drive device 100, the program is installed from the recording medium 101 through the drive device 100 to the auxiliary storage device 102. However, the program does not necessarily have to be installed from the recording medium 101, and may be downloaded from another computer through a network. The auxiliary storage device 102 stores the installed program, and stores necessary files, data, or the like.

In response to an activation instruction of a program, the memory device 103 reads out the program from the auxiliary storage device 102 and stores the program. The CPU 104 realizes a function relevant to the test device 10 in accordance with the program stored in the memory device 103. The interface device 105 is used as an interface for connection to a network. The display device 106 displays a graphical user interface (GUI) or the like based on the program. The input device 107 is constituted by a keyboard, a mouse, and the like, and is used for inputting various operation instructions.

Figure 3:
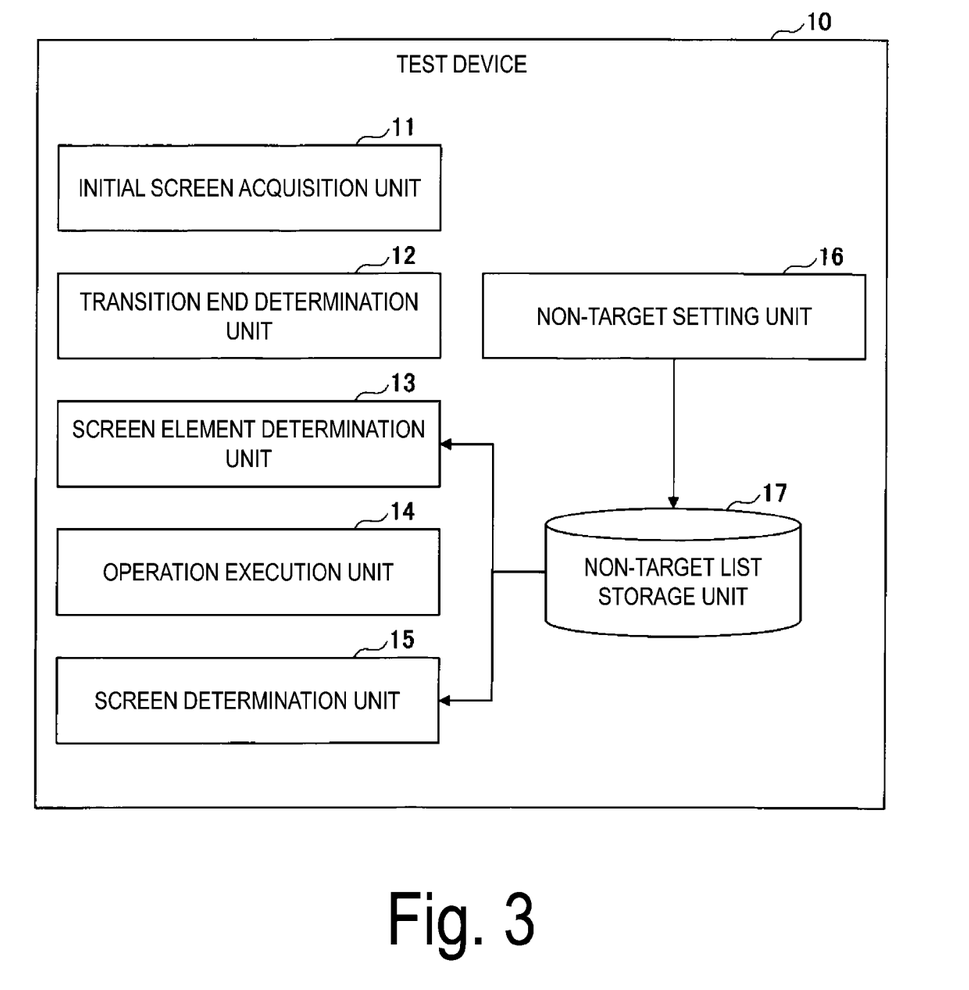
FIG. 3 is a diagram illustrating a functional configuration example of the test device 10 in the embodiment of the present invention.

FIG. 3 is a diagram illustrating a functional configuration example of the test device 10 in the embodiment of the present invention. In FIG. 2, the test device 10 includes an initial screen acquisition unit 11, a transition end determination unit 12, a screen element determination unit 13, an operation execution unit 14, a screen determination unit 15, a non-target setting unit 16, and the like. Each of these units is realized by processing that one or more programs installed in the test device 10 causes the CPU 104 to execute. In addition, the test device 10 uses a non-target list storage unit 17. The list storage unit can be realized using, for example, a storage device or the like capable of being connected to the auxiliary storage device 102 or the test device 10 through a network.

The non-target list storage unit 17 stores setting information in which screens and screen elements excluded from the test targets are set in advance (hereinafter referred to as a "non-target list").

Figure 4:
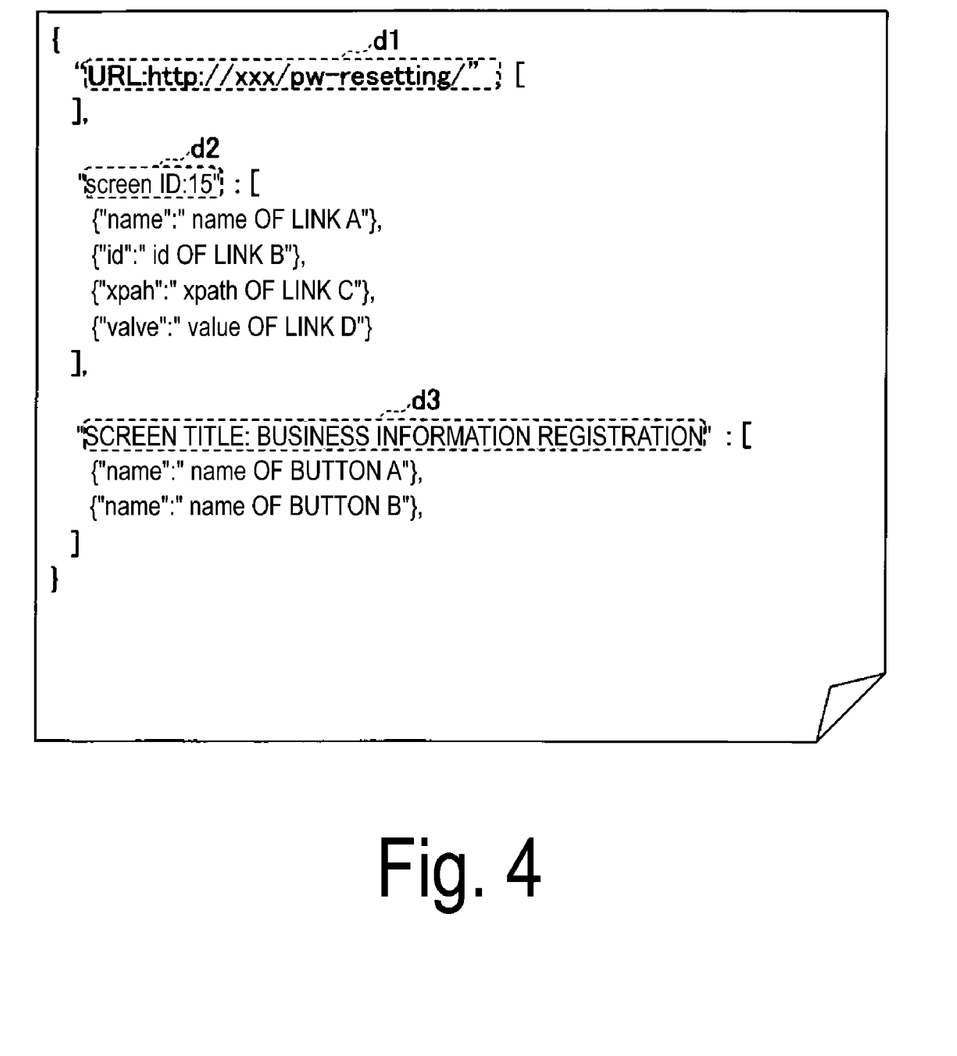
FIG. 4 is a diagram illustrating an example of a non-target list.

FIG. 4 is a diagram illustrating an example of the non-target list. Although FIG. 4 illustrates an example in which the non-target list is described in a JSON format, the format of the non-target list is not limited to a predetermined one.

In FIG. 4, a description d1, a description d2, and a description d3 are identification information of a screen excluded from the test targets or a screen including screen elements excluded from the test targets (hereinafter both are referred to as a "non-target screen"). The description d1 is an example in which the identification information of a screen is described by a URL. The description d2 is an example in which the identification information of a screen is described by a screen ID. The description d3 is an example in which the identification information of a screen is described by a screen title. The screen ID is an ID indicating a hash value generated from a DOM tree of a screen or a screen unit to be identified by a user. Meanwhile, the DOM tree may be a DOM tree in which, in order to prevent substantially a same screen from being determined to be a different screen due to a slight difference, nodes having no influence on the role of a screen (that is, having no influence on the identification of a screen) are deleted from a node group, and nodes (parallel nodes) having a parallel relationship in a DOM tree are aggregated into one node.

Meanwhile, when the URL of a screen is already known and invariable, a URL can be used as identification information of the screen. In addition, when the URL of the screen varies according to the situation, or the like, a screen title can be used as identification information of the screen. In addition, when a user desires to designate a screen for each screen to be identified, a screen ID can be used as identification information of the screen.

In the non-target list, [ ] is described after the identification information of each screen. In [ ], attributes and attribute values for identifying screen elements desired to be excluded from test targets (hereinafter referred to as "non-target elements") among screen elements of the screen are described. As such attributes, id, name, xpath, value, and the like may be used.

Meanwhile, in the non-target list, the non-test target screen with blank [ ] (the screen related to the description d1 in FIG. 4) indicates that the screen itself is designated as a non-test target. The screens with [ ] in which attribute values of screen elements are included (the screens related to the description d2 and the description d3 in FIG. 4) indicate that the screen elements related to the attribute values in the screens, not the screens themselves, are designated as non-test targets.

Figure 5:
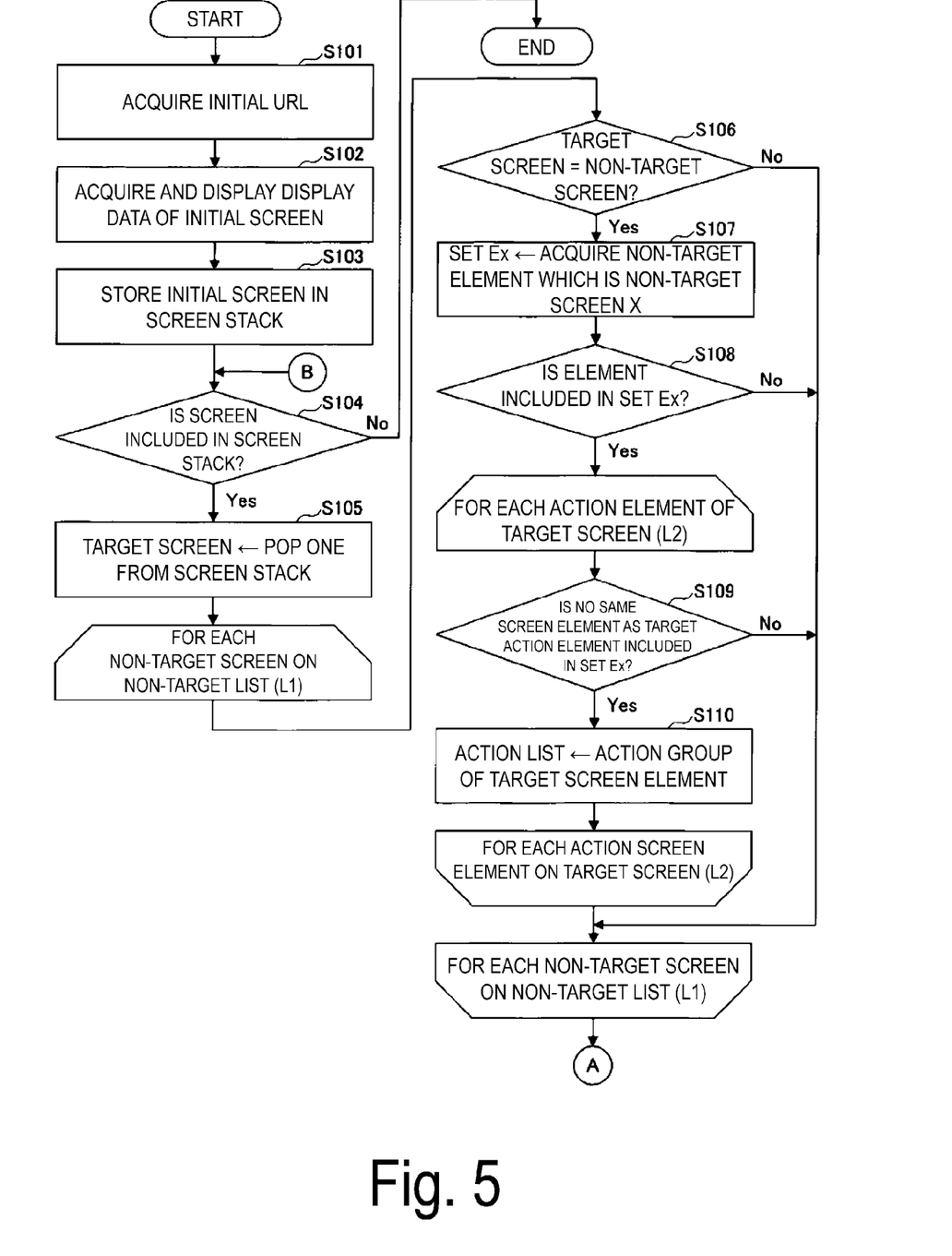
FIG. 5 is a flowchart illustrating an example of a processing procedure executed by the test device 10.
Figure 6:
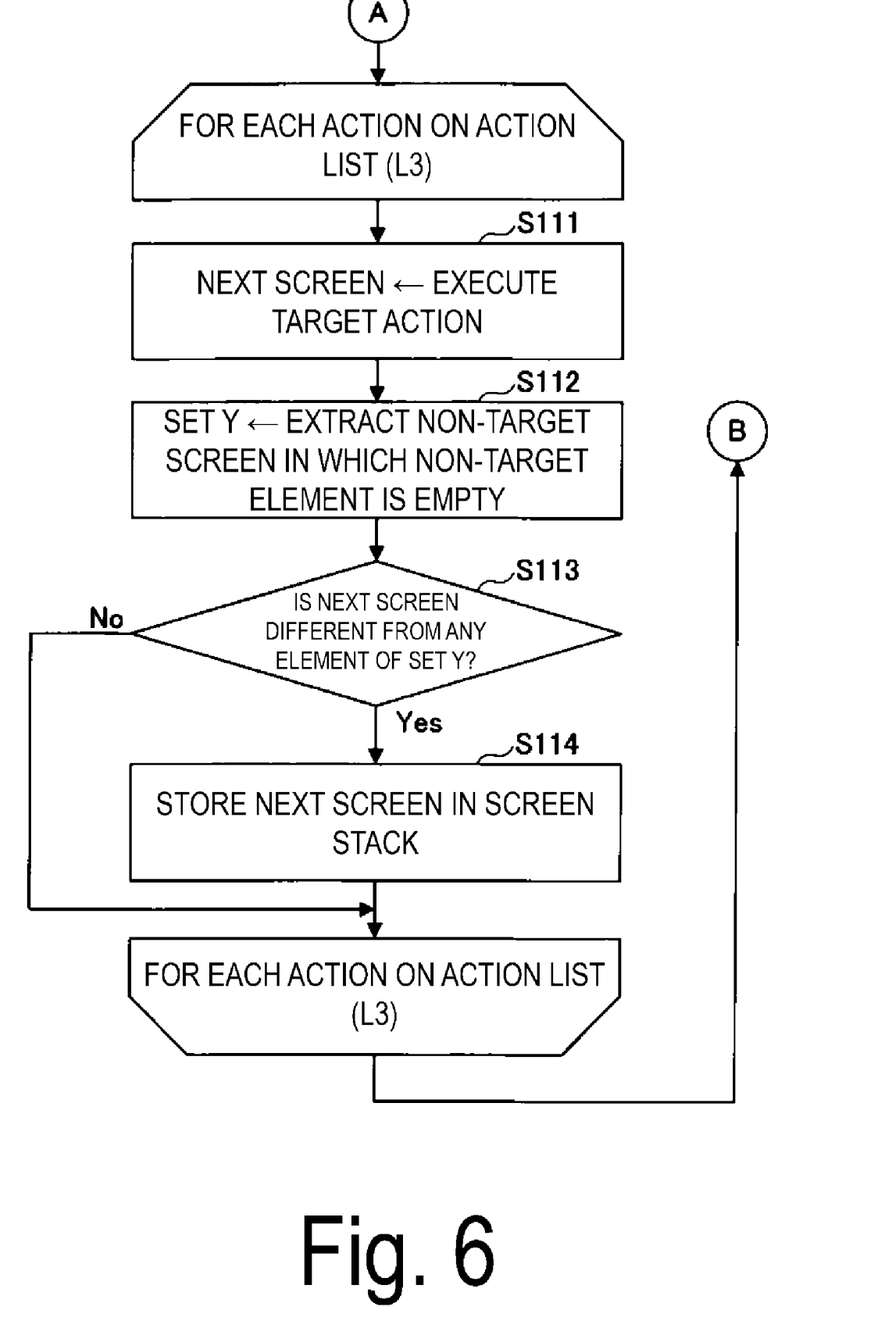
FIG. 6 is a flowchart illustrating an example of a processing procedure executed by the test device 10.

Hereinafter, a processing procedure which is executed by the test device 10 will be described. FIGS. 5 and 6 are flowcharts illustrating an example of a processing procedure which is executed by the test device 10.

In step S101, the initial screen acquisition unit 11 acquires an initial uniform resource locator (URL) of a web application to be tested (hereinafter referred to as a "target application"). The term "initial URL" refers to a URL for a screen serving as a starting point (hereinafter referred to as an "initial screen") in screen transition of a target application. Meanwhile, the initial URL may be input by a user at the timing of step S101, or may be set in advance and stored in the auxiliary storage device 102 or the like.

Next, the initial screen acquisition unit 11 acquires display data of the initial screen (such as HTML data) corresponding to the initial URL by accessing a target URL, and uses a Web browser to display a target screen on the display device 106 based on the display data (S102). Next, the initial screen acquisition unit 11 store (pushes) screen data of the initial screen in a screen stack (S103). The screen stack is a storage unit (stack) for storing screen data in a first-in last-out format, and can be realized using the memory device 103 or the like. Meanwhile, the term "screen data" refers to data including information of each screen element deployed in a screen related to the screen data. The screen elements are classified broadly into a screen element which is accompanied by an action such as a list, a button, or a link (hereinafter referred to as an "action element") and a screen element which is not accompanied by an action such as an input form or a label.

Next, the transition end determination unit 12 determines whether the screen stack is empty (S104). That is, the presence or absence of a screen which is a transition destination is determined. When the screen stack is not empty (Yes in S104), the screen element determination unit 13 pops (extracts) one piece of screen data from the screen stack (S105). Hereinafter, a screen related to the extracted screen data is referred to as a "target screen."

Next, loop processing including steps S106 to S110 (hereinafter referred to as "loop processing L1") is executed for each non-target screen in which identification information is designated in the non-target list (FIG. 4) stored in the non-target list storage unit 17. A non-target screen which is a processing target in the loop processing L1 is hereinafter referred to as a "non-target screen X."

In step S106, the screen element determination unit 13 determines whether the target screen coincides with the non-target screen X. The screen coincidence may be determined based on whether the URL, the screen title, the screen ID, or the like coincides.

When the target screen is not the non-target screen X (No in S106), the subsequent processing in the loop processing L1 is not executed with respect to the non-target screen X. When the target screen coincides with the non-target screen X (Yes in S106), the screen element determination unit 13 acquires all the non-target elements belonging to the non-target screen X from the non-target list (FIG. 4) (S107). A set of the acquired non-target elements is hereinafter referred to as a "set Ex." However, when there is no non-target element belonging to the non-target screen X, the set Ex is an empty set.

Next, the screen element determination unit 13 determines whether one or more non-target elements are included in the set Ex (S108). When the set Ex is an empty set (No in S108), the subsequent processing in the loop processing L1 is not executed with respect to the non-target screen X. When one or more non-target elements are in the set Ex (Yes in S108), loop processing including steps S109 and S110 (hereinafter referred to as "loop processing L2") is executed for each action element of the target screen. An action element which is a processing target in the loop processing L2 is hereinafter referred to as a "target action element."

In step S109, the screen element determination unit 13 determines whether the set Ex includes the same screen element as the target action element. That is, it is determined whether the target action element is a non-test target. When the same screen element as the target action element is included in the set Ex (No in S109), step S110 is not executed. When the same screen element as the target action element is not included in set Ex, that is, when the target action element is not a non-test target (Yes in S109), the operation execution unit 14 generates an action group related to the target action element, and adds the generated action group to an action list. Here, the term "action" refers to an operation command for a screen element. When the target action element is an OK button of the form or the like, a plurality of types of actions can be defined by a combination of input values to the form. Accordingly, one or more action groups are added to the action list with respect to the target action element. Meanwhile, as for a method of generating a combination of input values or the like, it is only required that a known reverse-based test technique or the like is referred to.

When the loop processing L2 is executed with respect to all the action elements of the target screen, the non-target screen which is not a processing target of the loop processing L1 in the non-target list is set as a processing target (non-target screen X) and the loop processing L1 is executed.

When the loop processing L1 is executed with respect to all the non-target screens in the non-target list, loop processing including steps S111 to S114 (hereinafter referred to as "loop processing L3") of FIG. 6 is executed for each action included in the action list. An action which is an execution target in the loop processing L3 is hereinafter referred to as a "target action."

In step S111, the operation execution unit 14 automatically executes the target action with respect to the target screen. For example, a script may be generated based on the target action, and the script may be automatically executed. As a result, a screen transition is generated, and a screen which is a transition destination (hereinafter referred to as "the next screen") is downloaded and displayed on a web browser.

Next, the screen determination unit 15 acquires identification information of the non-target screen in which the non-target element is empty from the non-target list stored in the non-target list storage unit 17 (FIG. 4) (S112). A set of the acquired identification information is hereinafter referred to as a "set Y." In the example of FIG. 4, the description d1 is identification information of the non-target screen in which the non-target element is empty.

Next, the screen determination unit 15 determines whether identification information of the next screen is different from any element (identification information) of the set Y (S113). That is, it is determined whether the next screen is a non-test target. When the identification information of the next screen coincides with any element of the set Y (No in S113), step S114 is not executed. When the identification information of the next screen is different from any element of the set Y (Yes in S113), the screen determination unit 15 stores (pushes) screen data of the next screen in the screen stack (S114). When the loop processing L3 is executed with respect to all the actions in the action list, the process returns to step S104.

In step S104, when the screen stack is not empty (Yes in S104), step S105 and the subsequent steps are executed. When the screen stack is empty (No in S104), the processing of FIG. 5 ends. Accordingly, a screen which is a transition destination from the initial screen is recursively set as a test target. However, a screen designated in the non-target list as a non-test target is excluded from the transition destination. In addition, a screen element designated in the non-target list as a non-test target in the screen which is a transition destination is excluded from a test target (action target).

Meanwhile, the non-target screen and the non-test target element may be designated using a GUI as follows.

Figure 7:
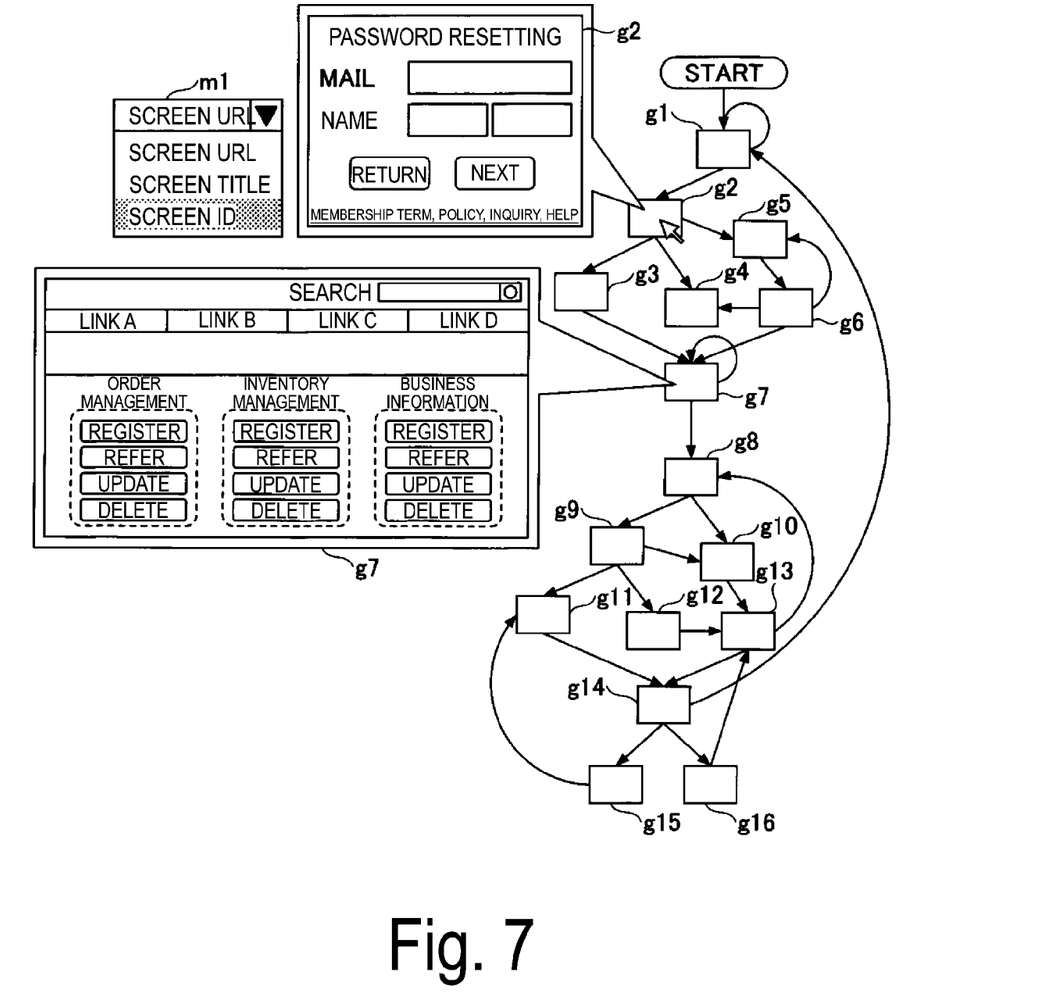
FIG. 7 is a diagram illustrating a designation example of screens excluded from test targets.

FIG. 7 is a diagram illustrating a designation example of screens which are non-test targets. FIG. 7 illustrates an example in which non-test target screens are designated using a screen transition diagram or screen information that can be restored from analysis information acquired by the reverse-based test technique.

FIG. 7 illustrates a screen transition diagram in which screens g1 to g16 are transition destinations. When a cursor is aligned on any screen on the screen transition diagram, the non-target setting unit 16 displays the thumb nail of the screen on the display device 106. FIG. 7 illustrates an example in which a cursor is aligned on the screen g2 and the thumb nail of the screen g2 is displayed.

In this state, for example, when an operation such as "a specific key+click" is performed, the non-target setting unit 16 displays a pull-down menu m1 on the display device 106. Identification information of the screen g2 included in the analysis information based on the reverse-based test technique is included in the pull-down menu m1 as menu items. When any menu item is selected from among the menu items of the pull-down menu m1, the non-target setting unit 16 records identification information related to the selected menu item as identification information of the non-test target screen in the non-target list. FIG. 7 illustrates an example in which the screen ID is selected.

Figure 8:
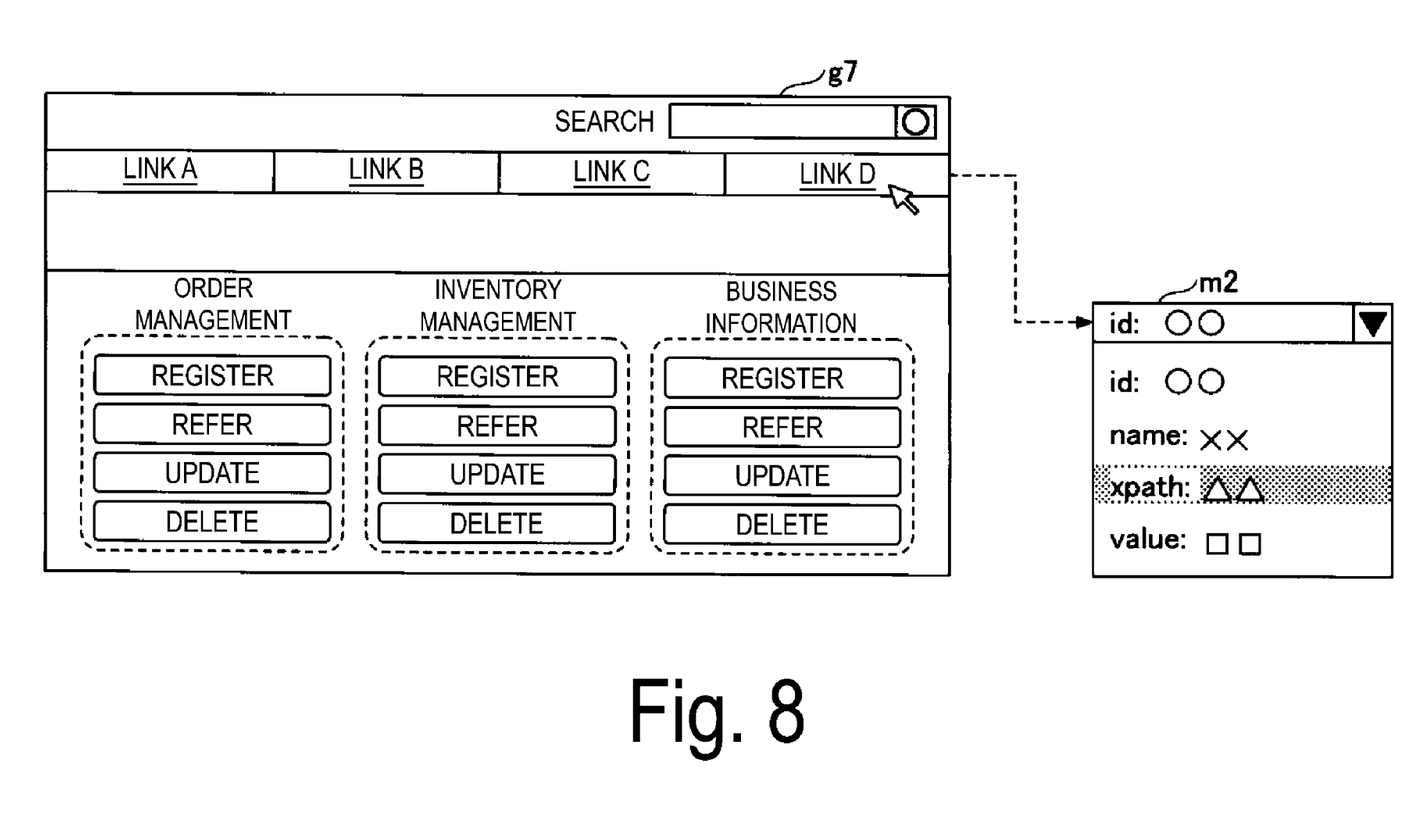
FIG. 8 is a diagram illustrating a designation example of screen elements excluded from the test targets.

FIG. 8 is a diagram illustrating a designation example of screen elements which are non-test targets. For example, when the thumb nail of the screen g7 in FIG. 7 is clicked, screen information of the screen g7 (screen information acquired by the reverse-based test technique) is displayed. When an operation such as "a specific key+click" is performed in a state where a cursor is aligned with respect to any screen element of the screen g7 (a "link D" in FIG. 8), the non-target setting unit 16 displays a pull-down menu m2 on the display device 106. The pull-down menu m1 includes menu items including an attribute value for each attribute capable of identifying the screen element which is included in the analysis information based on the reverse-based test technique. When any menu item is selected from the menu items of the pull-down menu m2, the non-target setting unit 16 records an attribute value related to the selected menu item as identification information of the screen element which is a non-test target in the non-target list with respect to the link D.

By making it possible to designate the non-target screen and the non-target element in this manner, a user can easily designate a screen or a screen element which is a non-test target.

As described above, according to the present embodiment, it is possible to exclude some elements related to a screen from test targets. That is, although there is a possibility of a test script becoming obsolete when there is a specification change in a web application due to the development such as function addition/revision or the like which is generated in the reverse-based test technique, a range which is an analysis target can be limited by a user designating a specification change part as a screen or a screen element which is a non-test target.

As a result, even when there is a specification change in the web application, a regression test can be performed while avoiding the obsolescence of the test script.

Meanwhile, the present embodiment may be implemented to prevent the state of a web application (for example, the contents of a database) from being changed during a test, transition to an external site from being performed, unintended mail from being transmitted, or the like.

Meanwhile, in the present embodiment, the screen element determination unit 13 is an example of a first determination unit. The operation execution unit 14 is an example of an execution unit. The screen determination unit 15 is an example of a second determination unit.

Hereinbefore, although the embodiment of the present invention has been described, the present invention is not limited to such specific embodiments, and can be modified and changed variously without departing from the scope of the invention described in the appended claims.

REFERENCE SIGNS LIST

10 Test device
11 Initial screen acquisition unit
12 Transition end determination unit
13 Screen element determination unit
14 Operation execution unit
15 Screen determination unit
16 Non-target setting unit
17 Non-target list storage unit
100 Drive device
101 Recording medium
102 Auxiliary storage device
103 Memory device
104 CPU
105 Interface device
106 Display device
107 Input device
B Bus

The invention claimed is:

1. A test device comprising a processor configured to execute operations comprising:

interactively receiving a selection of a screen element of a first screen of an application as a non-test target type through a user interface, wherein the non-test target type designates the screen element for without performing dynamic analytical testing of the application according to reverse-based testing of the application, and the reverse-based testing of the application represents a dynamic analytical testing of the application, and the dynamic analytical testing comprises: automatically generating a specification of the application by dynamically analyzing a program code of the application and further generating, based on the generated specification, a test scenario of the application for automatic testing of the application;

storing the interactively received selection of the screen element of the first screen and an input value of the screen element of the first screen in setting information, wherein the setting information comprises one or more screen elements of one or more screens that are outside the scope of dynamic analytical testing of the application according to the reverse-based testing of the application, and the setting information further comprises one or more input values to the one or more screen elements of the one or more screens for automating operations of the one or more screen elements without performing the dynamic analytical testing of the application;

identifying, based on automatically analyzing the program code of the application, the screen element of the first screen of the application;

determining, based on the setting information, the identified screen element of the first screen as the non-test target type and the input value of the screen element of the first screen for executing without performing the dynamic analytical testing of the application;

automatically executing, using the input value of the screen element, an operation of the screen element of the first screen as the non-test type without generating the a test script and without performing the dynamic analytical testing of the screen element of the first screen of the application;

identifying, based on the setting information and automatically analyzing a program code of the application, another screen element as a test target type for the dynamic analytical testing of the application, wherein the setting information excludes said another screen element as the non-test target type;

generating, based on the program code of the application, input action information of said another screen element for performing dynamic analytical testing of the application; and automatically executing, based on the input action information of said another screen element, the application with said another screen element to generate the test scenario of the application as a part of performing the dynamic analytical testing of the application.

2. The test device according to claim 1, further comprising:

determining, based on the setting information whether a second screen transitioned from the first screen in accordance with the automatically executing is non-test target type, wherein the automatically executing further comprises automatically executing an operation with respect to a screen element of the second screen determined not to be the non-test target type.

3. The test device according to claim 1, wherein the setting information set in advance includes at least one of a title of the screen element or an identifier of the screen element.

4. A test method comprising:

interactively receiving a selection of a screen element of a first screen of an application as a non-test target type through a user interface, wherein the non-test target type designates the screen element for without performing dynamic analytical testing of the application according to reverse-based testing of the application, and the reverse-based testing of the application represents a dynamic analytical testing of the application, and the dynamic analytical testing comprises: automatically generating a specification of the application by dynamically analyzing a program code of the application and further generating, based on the generated specification, a test scenario of the application for automatic testing of the application;

storing the interactively received selection of the screen element of the first screen and an input value of the screen element of the first screen in setting information, wherein the setting information comprises one or more screen elements of one or more screens that are outside the scope of dynamic analytical testing of the application according to the reverse-based testing of the application, and the setting information further comprises one or more input values to the one or more screen elements of the one or more screens for automating operations of the one or more screen elements without performing the dynamic analytical testing of the application;

identifying, based on automatically analyzing the program code of the application, the screen element of the first screen of the application;

determining based on the setting information, the identified screen element of the first screen as the non-test target type and the input value of the screen element of the first screen for executing as outside the scope of dynamic analytical testing of the application;

automatically executing, using the input value of the screen element, an operation of the screen element of the first screen as the non-test type without generating a test script and without performing the dynamic analytical testing of the screen element of the first screen of the application;

identifying, based on the setting information and automatically analyzing a program code of the application, another screen element as a test target type for the dynamic analytical testing of the application, wherein the setting information excludes said another screen element as the non-test target type;

generating, based on the program code of the application, input action information of said another screen element for performing dynamic analytical testing of the application; and automatically executing, based on the input action information of said another screen element, the application with said another screen element to generate the test scenario of the application as a part of performing the dynamic analytical testing of the application.

5. The test method according to claim 4, the method further comprising:

determining, based on the setting information, whether a second screen transitioned from the first screen in accordance with the automatically executing is the non-test target type, wherein the automatically executing further comprises automatically executing an operation with respect to a screen element of the second screen determined not to be the non-test target type.

6. The test method according to claim 4, wherein the setting information set in advance includes at least one of a title of the screen element or an identifier of the screen element.

7. A computer-readable non-transitory recording medium storing computer-executable program instructions that when executed by a processor cause a computer system to:

interactively receive a selection of a screen element of a first screen of an application as a non-test target type through a user interface, wherein the non-test target type designates the screen element for without performing dynamic analytical testing of the application according to reverse-based testing of the application, and the reverse-based testing of the application represents a dynamic analytical testing of the application, and the dynamic analytical testing comprises: automatically generating a specification of the application by dynamically analyzing a program code of the application and further generating, based on the generated specification, a test scenario of the application for automatic testing of the application;

store the interactively received selection of the screen element of the first screen and an input value of the screen element of the first screen in setting information, wherein the setting information comprises one or more screen elements of one or more screens that are outside the scope of dynamic analytical testing of the application according to the reverse-based testing of the application, and the setting information further comprises one or more input values to the one or more screen elements of the one or more screens for automating operations of the one or more screen elements without performing the dynamic analytical testing of the application;

identify, based on automatically analyzing the program code of the application, the screen element of the first screen of the application;

determine, based on the setting information set, the identified screen element of the first screen as the non-test target type and the input value of the screen element of the first screen for executing without performing the dynamic analytical testing of the application;

automatically execute, using the input value of the screen element, an operation of the screen element of the first screen as the non-test type without generating a test script and without performing the dynamic analytical testing of the screen element of the first screen of the application;

identify, based on the setting information and automatically analyzing a program code of the application, another screen element as a test target type for the dynamic analytical testing of the application, wherein the setting information excludes said another screen element as the non-test target type;

generate, based on the program code of the application, input action information of said another screen element for performing dynamic analytical testing of the application; and automatically execute, based on the input action information of said another screen element, the application with said another screen element to generate the test scenario of the application as a part of performing the dynamic analytical testing of the application.

8. The computer-readable non-transitory recording medium according to claim 4, the computer-executable program instructions when executed further causing the system to:

determine, based on the setting information, whether a second screen transitioned from the first screen in accordance with the automatically executing is the non-test target type, wherein the automatically executing further comprises automatically executing an operation with respect to a screen element of the second screen determined not to be a non-test target type.

9. The computer-readable non-transitory recording medium according to claim 7, wherein the setting information set in advance includes at least one of a title of the screen element or an identifier of the screen element.

* * * * *